United States Patent [19]

McArthur et al.

[11] E Re. 31,478

[45] Reissued Dec. 27, 1983

[54] ROTARY BEAM CHOPPER AND SCANNING SYSTEM

[75] Inventors: Colin S. McArthur; Douglas C. Clark, both of Winston-Salem, N.C.

[73] Assignee: R. J. Reynolds Tobacco Company, Winston-Salem, N.C.

[21] Appl. No.: 71,334

[22] Filed: Aug. 30, 1979

Related U.S. Patent Documents

Reissue of:

[64] Patent No.: 4,118,619
Issued: Oct. 3, 1978
Appl. No.: 821,103
Filed: Aug. 2, 1977

[51] Int. Cl.[3] ..... B23K 27/00

[52] U.S. Cl. ..... 219/121 LK; 219/121 LQ; 219/121 LT; 219/121 LW

[58] Field of Search ..... 219/121 L, 121 LA, 121 LC, 219/121 LD, 121 LG, 121 LK, 121 LL, 121 LM, 121 LN, 121 LP, 121 LQ, 121 LS, 121 LT, 121 LU, 121 LV, 121 LW, 121 LY, 384; 346/76 L, 108; 340/190, 201 P; 250/233; 350/6.1, 6.5, 6.6, 6.9, 266, 273, 274, 275, 285; 356/323, 324, 325, 447; 162/114, 139, 260; 131/21 R, 23 R; 358/199, 202, 204, 205, 206, 285, 297

[56] References Cited

U.S. PATENT DOCUMENTS

| | | | |
|---|---|---|---|
| 1,828,571 | 10/1931 | Langmuir | 358/205 |
| 2,547,623 | 4/1951 | Cockrell | 350/6.6 X |
| 3,022,704 | 2/1962 | Cary | 356/324 |
| 3,173,993 | 3/1965 | Smith et al. | 358/202 X |
| 3,226,527 | 12/1965 | Harding | 219/384 |
| 3,256,524 | 6/1966 | Stauffer | 346/76 L |
| 3,303,739 | 2/1967 | Chitayat | 350/6.2 |
| 3,325,819 | 6/1967 | Fraser | 346/76 L |
| 3,543,183 | 11/1970 | Heimann | 331/94.5 |
| 3,617,702 | 11/1971 | Flounnoy | 219/121 L |
| 3,677,465 | 7/1972 | Johnson et al. | 346/76 L |
| 3,760,153 | 9/1973 | Davies et al. | 219/384 |
| 3,787,121 | 1/1974 | Lowy et al. | 250/233 X |
| 3,862,396 | 1/1975 | Machida et al. | 219/384 |
| 3,901,601 | 8/1975 | Lahmann | 250/233 X |
| 3,965,327 | 6/1976 | Ehlscheid et al. | 219/121 LM |
| 3,985,420 | 10/1976 | Grose | 350/285 X |
| 3,993,402 | 11/1976 | Fredrick, Jr. | 350/285 |
| 4,121,595 | 10/1978 | Heitmann et al. | 131/21 R |

FOREIGN PATENT DOCUMENTS 1400016 7/1975 United Kingdom .

*Primary Examiner*—C. L. Albritton
*Attorney, Agent, or Firm*—Grover M. Myers

[57] ABSTRACT

An optical laser beam chopper for converting a continuous beam into a series of scanning impulses for use in perforating a moving web is disclosed. The system utilizes a coherent light source which produces a beam for use in performing a thin paper web of the type used in producing cigarette filters. The beam passes through a rotary chopper, or shutter, system which incorporates a plurality of rotary discs each of which carries one or more annular rings divided into segments. Selected segments on each ring are formed of a reflective material to act as mirrors for the laser beam, while the remaining segments are in the form of apertures which allow the beam to pass through the disc. By properly aligning the various apertures and reflective surfaces, rotation of the discs will cause the beam to be cyclically directed along a variety of paths through the disc arrangement to periodically strike selected target areas on an adjacent target such as a web of paper, the repetitive cycling causing the beam to scan the various target areas. In the preferred form of the invention, the beam produces spaced perforations in the web, with motion of the paper web in a direction perpendicular to the direction of scan of the beam producing longitudinal rows of perforations, adjacent perforations being spaced in accordance with the speed of the web and the rate of scanning. The rotary disc segments thus serve to chop the laser beam into short impulses, each of which is directed to a target area corresponding to the angular position of the rotary disc.

25 Claims, 9 Drawing Figures

FIG. 2
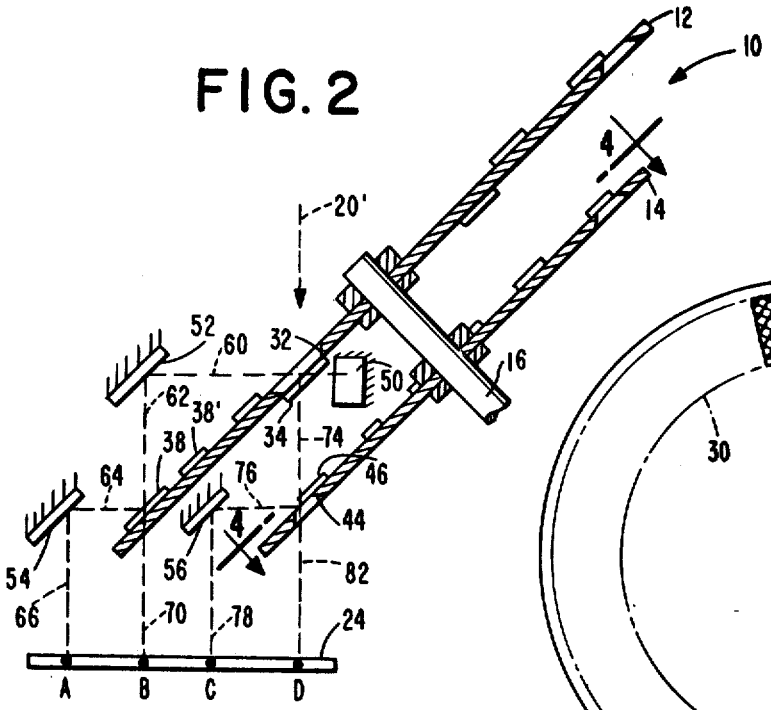
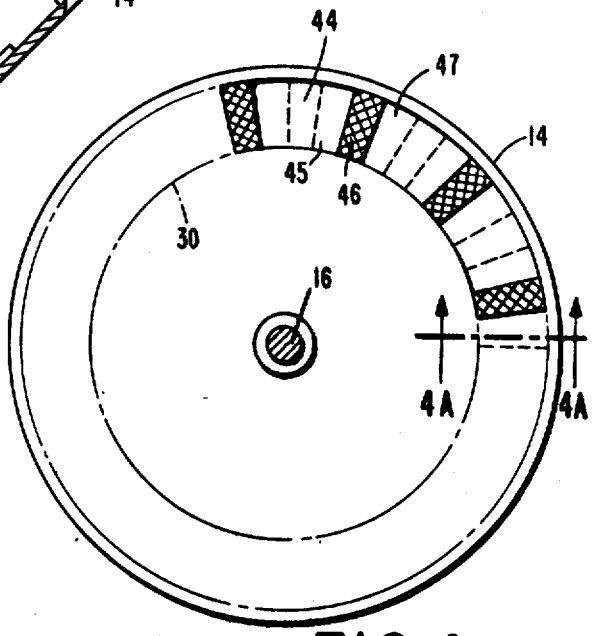
FIG. 4
FIG. 3
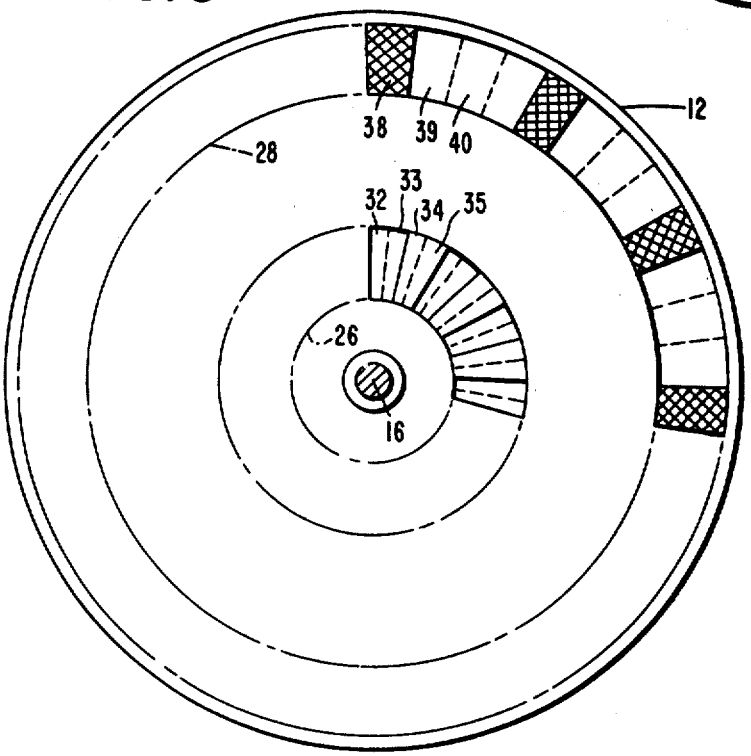
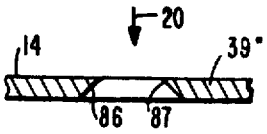
FIG. 4A

ROTARY BEAM CHOPPER AND SCANNING SYSTEM

Matter enclosed in heavy brackets [ ] appears in the original patent but forms no part of this reissue specification; matter printed in italics indicates the additions made by reissue.

*This application is a reissue of application Ser. No. 821,103, filed Aug. 2, 1977, now U.S. Pat. No. 4,118,619.*

BACKGROUND OF THE INVENTION

The present invention relates, in general, to a rotary beam interrupter and scanner system for use with a high energy light source, and more particularly to a method and apparatus for chopping a continuous laser beam into a plurality of bursts, or impulses, and directing such impulses to corresponding target areas, the system being arranged to repetitively scan the selected target areas. In a particular application of the system, the beam impulses are used to perforate multiple rows of holes or slots in a web traveling at a high rate of speed.

The present interrupter and scanner system is in the form of a plurality of rotary shutters which alternately block a beam of light or allow it to pass through selected portions to direct the beam to selected target areas. Shutter systems for light beams, and in particular for lasers, are generally well known, and usually take the form of, or incorporate, beam splitter systems. Some of these systems have been utilized for scanning purposes and are described in prior art publications such as U.S. Pat. No. 3,910,675. Because lasers offer the advantage of optically controllable, concentrated power, it has been proposed to use them for perforating webs, and such use is illustrated in the laser recording apparatus disclosed in U.S. Pat. No. 3,256,524. In most of the presently known laser devices which utilize an interrupted beam to produce spaced pulses or bursts of energy, the beam is interrupted by internally pulsing the laser, thereby producing intermittent, discrete energy bursts. Since a laser can be internally pulsed at very high frequencies, the time delay between pulses is sufficiently short for most uses of the beam. However, it has been found that even at the upper limits of the pulse frequency for lasers the repetition rate is not sufficiently high for some applications. For example, where it is desired to produce closely spaced perforations in a traveling web, the speed of the web is limited by the internal pulse capabilities of the laser, and it has been found that this places a relatively low limit on the rate at which such webs can be produced. Where production capabilities of perforated webs must be increased to meet demand, therefore, the only alternative presently available is the addition of duplicate laser systems, requiring considerable capital expenditure not only for the laser system, but for the increased space and personnel requirements. A prime example of an industry where such a problem is faced is the tobacco industry.

Perforated paper has been utilized for many years in the manufacture of cigarettes. Initially, the paper was perforated by mechanical devices such as one or more needles mounted for motion toward and away from a web of paper, the needle moving down to penetrate the web to form a hole. Although such devices form uniform, evenly spaced holes the mechanical motions were cumbersome and slow. More recently, electrical spark perforators have been provided wherein electrical arcs are produced to form the required hole. However, such devices do not produce uniform holes, and also have proven to be too slow to meet the requirements of the newly developed generation of high speed cigarette makers presently being utilized in the industry.

In order to meet the need for increased production, attempts have been made to use lasers for perforating the paper webs, for a laser has the advantage of permitting high speed operation and the light beam can be controlled by relatively reliable optical systems. Unfortunately, it has been found that although available laser devices can be pulsed at high frequencies, no commercially available units have been found capable of operating at a sufficiently high rate to obtain the web speeds now required to meet the needs of cigarette making machines for perforated paper. A limiting factor in the ability of a pulsed laser to operate at the required speed is the fact that where the laser is pulsed, it is working to produce a light beam only 50 percent of the time; thus, the beam is only available for about one-half of a given period and during the off period it is not capable of perforating the web. In an attempt to overcome this limitation, laser systems have been devised which utilize beam splitters, wherein partial reflectors divide an incoming beam into a plurality of beams. However, each time the beam is split by a partial reflector, the energy level of each resulting beam is correspondingly reduced not only by the fact that the beam has been split, but by the losses which occur in the splitters. Such beam splitters have been found unsatisfactory in web perforators since it is important to have a uniform energy level from all of the beams produced by the system so that the perforations in the web will be uniform. Further, since the energy level of the beam is reduced each time it passes through a splitter, the resultant beams have a relatively low energy level which in some cases is not sufficient to reliably produce uniform perforations.

SUMMARY OF THE INVENTION

It is, therefore, an object of the present invention to provide a light interrupting system which produces multiple output beam impulses from a single beam source.

It is a further object of the invention to provide a light interrupting and scanning system which produces multiple output beam impulses in sequence from a single light beam source, whereby each of the output beam impulses has substantially the same intensity as the source beam.

Another object of the invention is to provide a beam interrupter system in which virtually one hundred percent of the source beam energy is provided at the system output.

Another object of this invention is to provide a shutter system for producing a plurality of output beam impulses from a single source beam wherein all of the output beam impulses are of a uniform energy level.

A further object of the present invention is to provide a light interrupting shutter system for use in combination with a laser beam to provide spaced, uniformly shaped perforations in a moving web.

Still another object of the present invention is the provision of a perforator system which is capable of producing multiple uniform perforations in a web moving at a high rate of speed.

In accordance with the present invention, a single beam of energy from a source such as a laser is divided into a series of beam impulses which may be scanned across a target to impinge upon a plurality of individual, spaced target areas. The beam is formed into discrete impulses and is scanned across the target without the need to operate the beam source in a pulsed manner; a continuous beam is provided and this beam is broken up by means of a rotating shutter arrangement which operates as a beam chopper. A plurality of beam paths are provided through the shutter arrangement to scan the beam across the target, the paths being formed by reflective and open segments in the rotating shutter elements. These segments divert the beam into different paths through the shutter elements in a stepwise manner in accordance with the angular position of the rotating shutter, thereby scanning the beam across the target to the individual target areas.

The pattern of the target areas and the sequence in which the beam strikes the various target areas is determined by selecting the locations and alignment of the reflective and open segments on the shutter elements. Thus, the beam impulses can be caused to traverse a target in steps to strike a row of target areas laterally across the target, and by simultaneous motion of the target and operation of the shutter system, each successive lateral row or scan will pass across a different portion of the target. By moving the target logitudinally, the beam impulses will impact on successive lateral rows spaced along the length of the target, with the spacing of the rows depending upon the speed of motion of the target with respect to the scanning rate.

In accordance with a preferred form of the invention, the target may be an elongated web of material such as paper and the beam of energy may be produced by a laser which will serve to produce perforations in the paper web. These perforations will be in rows extending laterally across the web, with successive rows of perforation being spaced longitudinally along the length of the web, thereby producing spaced longitudinal columns of holes across the target web.

The rotating shutter, in a preferred form of the invention, includes a rotatable shaft carrying a plurality of disc elements which rotate with the shaft. Each disc carries one or more annular optical shutter rings which are concentric with the axis of the shaft and which are located at selected radial distances from the center of their corresponding discs. Each shutter ring incorporates a plurality of reflective and "through opening" segments angularly spaced and alternately positioned around the circumference of the ring, with the rings on adjacent disc elements having their mirror and open segments so arranged and correlated as to provide a plurality of optical paths through and between the discs. In one embodiment of the system, one or more stationary mirrors are provided adjacent the rotatable discs to form parts of one or more of the beam paths through the shutter system. These exterior mirrors cooperate with the ring segments to direct the beam to various locations on the disc and thus form a part of the optical paths through the system.

As the disc elements are rotated, a continuous, stationary beam of light from a source such as a laser strikes the reflective and open segments of one or more discs for reflection by the disc or passage therethrough in selected paths. The beam follows first one path and then another through the shutter system, and is broken into a plurality of beam impulses, each of which is deflected toward a corresponding target area. Rotation of the shutter system causes the beam pulses or bursts to sequentially follow a pattern of target area illumination determined by the arrangement of segments on the discs, and thus repetitively to scan the target. In this manner, the full energy of the beam is directed to each target area in turn, thereby utilizing its full power to produce perforations which will be reliably and uniformly formed.

BRIEF DESCRIPTION OF THE DRAWINGS

The foregoing and additional objects, features and advantages of the present invention will be apparent to those skilled in the art from a consideration of the following detailed descriptions of preferred embodiments thereof, taken with the accompanying drawings, in which:

FIG. 2 is a sectional view of the shutter/scanning system of the invention, taken along line 2—2 of FIG. 1;

FIG. 3 is a top plan view of the shutter/scanner system illustrated in FIG. 1;

FIG. 4 is a sectional view taken along line 4—4 of FIG. 2;

FIG. 4A is a partial sectional view taken along lien 4A—4A of FIG. 4, showing the shape of the shutter apertures used in the shutter/scanning system of FIG. 1;

DESCRIPTION OF PREFERRED EMBODIMENT

Figure 1:
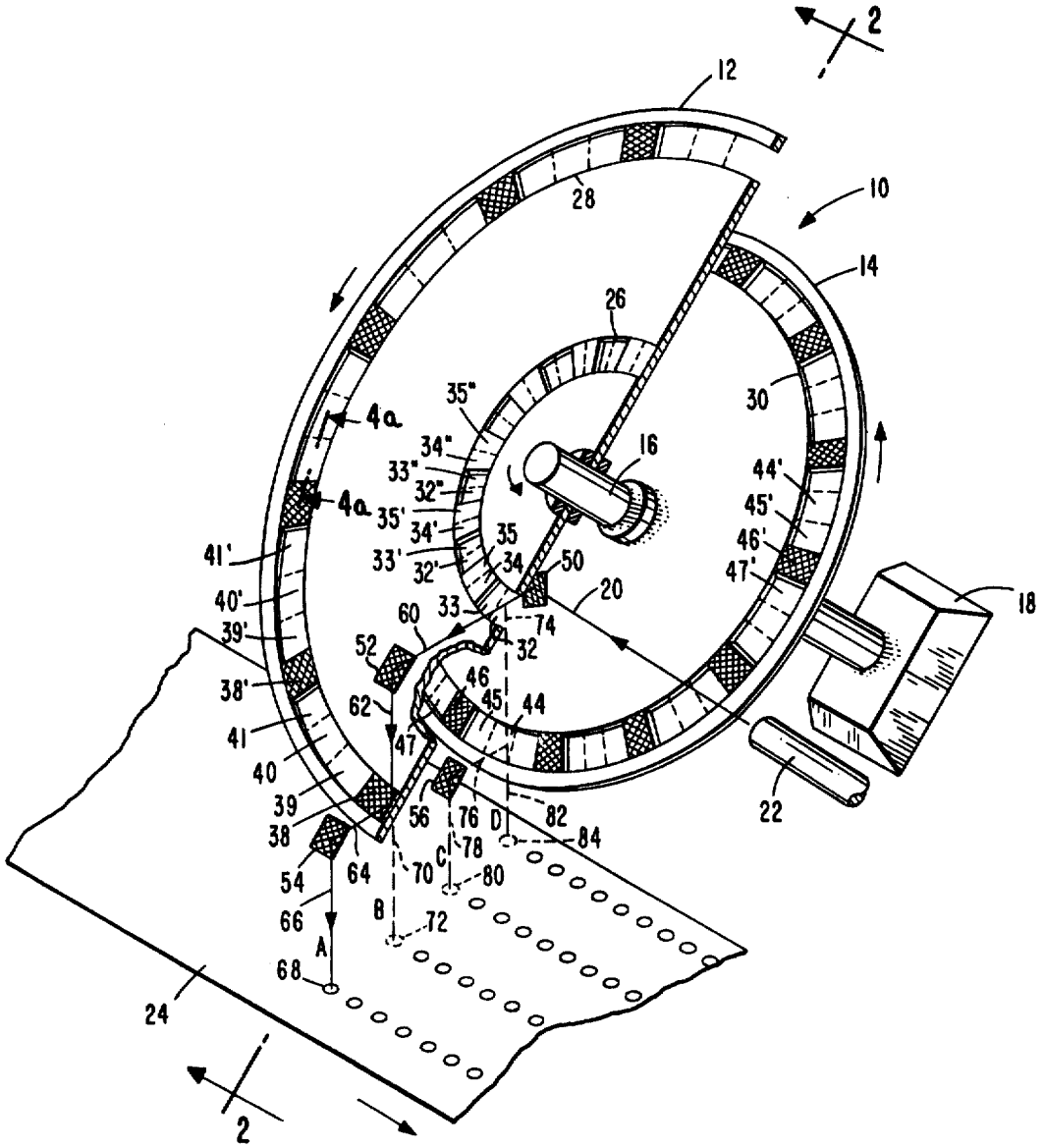
FIG. 1 is a perspective view of a first embodiment of the beam shutter and scanning system constructed in accordance with the present invention.

Turning now to a more detailed consideration of the drawings, reference is made to FIGS. 1, 2, 3 and 4 which illustrate a preferred embodiment of the invention. A rotary shutter system 10 operates in accordance with the invention to divide an input beam of energy such as light into a plurality of discrete beam impulses, or bursts. In this device, the initial beam is divided into four such beam impulses and, for purposes of illustration, the four beams are shown as being produced sequentially at four discrete target areas spaced laterally across a target in the form of a web of material such as paper.

The shutter system 10 comprises first and second disc elements 12 and 14 secured at spaced locations to a rotatable shaft or spindle 16. The two discs are coaxial with the shaft and thus are perpendicular thereto and parallel to each other. Shaft 16 is journalled in suitable bearings (not shown) and is connected to a drive mechanism 18 which may be an electric motor or the like which drives the spindle for rotation at a selected speed. A beam of light 20 from a suitable source 22 is diverted by the disc elements to selected portions of a target 24 which is shown as a movable web of paper that is to be perforated by the beam. For convenience in arranging the optical path followed by the beam and to insure that the beam strikes the target perpendicularly to produce uniform and accurately positioned perforations, it is preferred that the axis of spindle 16 be arranged at a 45° angle to the plane of the web 24. It will be understood from what follows that various other angular relationships may be used if desired; however, a 45° angle provides the simplest form of the invention, and thus is preferred.

To define the various paths that may be followed by beam 20, the rotatable discs 12 and 14 are provided with concentric annular shutter rings, disc 12 carrying rings 26 and 28, and disc 14 carrying ring 30 (see FIGS. 3 and 4). Each shutter ring is formed with a plurality of segments in the form of reflecting elements and through openings, or apertures. The reflecting elements and the apertures are spaced around the circumference of each ring and cooperate to define the optical paths for the beam. These rings may be formed in any desired manner, but typically the reflective portions will consist of a reflective coating placed on either the upper or lower surface of the discs, or both, as required, and the apertures will consist of openings through the discs in the required locations.

For simplicity in understanding the invention, the segments which are reflective, and which therefore carry a reflective coating on upper or lower surface of the disc, are shaded by cross-hatching, the segments which may be either open or closed since they do not affect the light path are indicated by a dotted shading, and the segments which are through passageways remain unshaded.

As is illustrated in FIGS. 1, 3 and 4, all of the shutter rings are divided into an equal number of segments, the segments on both disc elements being angularly aligned with each other to permit accurate selection of the beam paths. The open and the reflective segments are arranged in each ring in accordance with the scanning pattern desired; thus, the segments may be said to be coded in accordance with the scanning pattern to be produced by the beam pulses. Since in the illustrated example the incoming beam 20 is to be divided into four output beams, the shutter ring segments are arranged in sets of four with the sets being repetitive around the circumference of the ring. Thus, for example, the inner ring 26 on disc 12 incorporates segments 32, 33, 34 and 35. Segments 32 and 33 are through openings and together constitute a single aperture; however, for purposes of illustration the two segments are shown divided by a phantom line so that the relationship between the angular location of the segments on ring 26 and the angular location of the segments on ring 28 will be clear. Segments 34 and 35 on ring 26 are reflective and thus each carries a reflective coating. Because of the particular arrangement of the light paths in this embodiment, the reflective coating carried by segments 34 and 35 are on the bottom surface of disc 12, as indicated at 36 in FIG. 2. It will be understood that in other embodiments of the invention it might be desirable to provide such reflective surfaces on the top of disc 12, and thus reference to a reflective segment includes a segment having its reflective surface on either the top or the bottom, or on both. It will be seen that the set of segments 32–35 is repeated around the circumference of shutter ring 26 as indicated, for example, by set 32'–35', set 32''–35'' and so on, each set of segments producing a repetitive group of four light paths for beam 20.

In similar manner the annular shutter ring 28 includes a plurality of sets of four segments extending around its circumference. Although each ring includes the same number of sets, in ring 28 the segments for each set are differently arranged, or coded, to cooperate with the segments on ring 26 to further define the light paths followed by the beam 20. Thus, ring 28 includes a first segment 38 which is reflective, a second segment 39 which is a through opening, and third and fourth segments 40 and 41 which are not used and which thus may be through openings, reflective segments, or nonreflective closed segments. In this case they are illustrated as being through openings, with phantom lines indicating the dividing lines between segments. The reflective segment 38 includes a reflective coating 42 on the upper surface of disc 12 and, as was the case with ring 26, the set of segments 38–41 is repeated around the circumference of ring 28 as indicated, for example, by segments 38'–41'.

The shutter ring 30 carried by disc element 14 also has a plurality of sets of segments which are angularly aligned with the segments on disc element 12 so that corresponding segments are also vertically aligned. Thus, shutter ring 30 includes a set of segments indicated at 44, 45, 46, and 47, which segments correspond to and cooperate with segments 32–35 and segments 38–41 on disc 12. As indicated in FIGS. 1 and 4, the segments on ring 30 are coded so that segment 46 is reflective and segment 47 is a through opening, while segments 44 and 45 are not used, and thus may be either open or closed as will be seen from what follows. Again, the set of segments 44–47 is repeated around the circumference of ring 30, providing additional sets such as those indicated at 44'–47', for example.

The optical paths for the shutter system 10 are completed by externally mounted reflective mirrors 50, 52, 54 and 56 which cooperate with the shutter rings to direct beam 20 through the four paths indicated above. These four paths are indicated by arrows and dotted lines on FIGS. 1 and 2 as terminating at target areas A, B, C and D, and the manner in which these paths are produced by the rotation of disc elements 12 and 14 will now be explained.

The beam of light 20 from a source such as a laser 22 is directed into the shutter/scanning system 10 from any convenient location and at any convenient angle, where it strikes the first directional mirror 50. This mirror is so positioned as to divert the light toward the annular shutter ring 26 carried by disc 12. In the example of FIG. 2, the beam of light may enter the shutter system in a direction perpendicular to the plane of the page, the mirror 50 being arranged at a 45" angle with that plane to direct the light beam at a 90° angle toward disc 12. Depending upon the angular position of disc 12, the light beam will either pass through one of the apertures 32 or 33, or will strike one of the reflective segments 34 or 35. Assuming that the disc is positioned at a first angular position for the start of a scanning cycle; that is, positioned so that the light beam is aligned with the first segments in corresponding sets of segments on each disc and for each shutter ring, the light beam reflected from mirror 50 passes through, for example, aperture 32 and follows the light path indicated by arrow 60, striking the directional mirror 52 which is positioned above the surface of disc 12.

Mirror 52 is positioned at a 45° angle with respect to the light path 60, and deflects the light beam along light path 62 toward the upper surface of the annular shutter ring 28. Depending upon the angular position of disc 12, the light beam following this path will either strike a reflective segment 38 or will pass through an aperture 39. With the discs 12 and 14 still positioned at the beginning of a scan cycle, the light beam is reflected from the upper surface of the reflective segment 38 to follow light path 64. The light strikes mirror 54 which deflects the light beam along light path 66 onto target area A of the web 24, producing a hole 68 in the web. Since the beam is not split or otherwise divided when it reaches the target area, the target receives the full intensity of the light source for a time period dependent upon the size of the aperture and the speed of rotation of the shutter.

As shown in FIG. 1, and more clearly illustrated in FIGS. 3 and 4, the annular shutter rings are spaced at different radial distances from the axes of their respective discs 12 and 14. The specific radial distances will depend upon the angles at which the light beam is to pass through the segments on the rings, and further will depend upon the number of discs used, the number of output impulses to be produced for each rotation of the discs, the location of the light beam source, the placement of the mirrors, and like factors. As may be seen in FIG. 2, the diameter of ring 30, and thus its radial distance from the axis of shaft 16, is sufficient to place the ring vertically below the innermost ring 26 on disc 12, when the shaft is at a 45° angle with respect to the target areas on the web, while the diameter or ring 28 is sufficiently great to provide the required spacing between adjacent target areas B and C. Thus, the radial position of the rings, the location of the mirrors and the angle of the shaft may be adjusted to regulate the spacing between the adjacent target areas.

It is preferred that the various mirrors and reflective surfaces, including those surfaces which are carried by the disc 12, be at 45° angles with respect to the direction of the impinging light beam 20, since such an arrangement produces a simple geometric pattern which insures that the light beam will pass through the various apertures without loss, insures sharp cut off points at the edges of the apertures, and delivers maximum power or intensity to the target area. It will be understood, however, that the mirrors and reflective surfaces may be arranged at different angles, if desired; however, the principle of operation remains the same.

It will be seen that in the first step of the scan cycle, the light beam is directed to target area A, and no light falls on any of the other target areas. Since beam 20 passes through aperture 32 no light is reflected to disc 14 and accordingly segment 44 does not have any effect on the light path. As discs 12 and 14 are rotated, for example, in a counter-clockwise direction as viewed from above, rotation of the shaft 16 through a predetermined angle will bring the second segments of corresponding sets on each of the annular shutter rings into alignment with the light beam being reflected from mirror 50. When the discs reach this second angular position, the light will pass through aperture 33 in shutter ring 36, and thus will continue to follow path 60 for reflection off mirror 52 along light path 62. However, reflective segment 38 is no longer aligned with light path 62, and the light beam will pass through aperture 39 to follow light path 70 onto target area B of web 24, thereby producing a second perforation 72 in the web. Again, no light reaches disc 14 at this position.

Continued rotation of discs 12 and 14 to a third angular position will carry the third segment 34 on shutter ring 26 into alignment with light path 60 and the reflective surface on the bottom of segment 34 will deflect the light beam downwardly along light path 74, thus for the first time directing the light beam toward disc 14. At this angular position, no light will reach mirror 62 and the corresponding segment 40 on shutter ring 28 can be either an open (aperture) segment or a closed segment, since it has no effect on the production of perforations. The light following path 74 strikes the third segment in the corresponding set of segments on shutter ring 30, the first two segments 44 and 45 having no effect on the production of perforations since no light was directed toward them during the first two angular positions of the discs. The third segment 46 is reflective and directs the light along light path 76 toward mirror 56 which, in turn, deflects the light downwardly along path 78 onto target area C of the web 24, where a third perforation 80 is formed.

Finally, continued rotation of the discs 12 and 14 brings the shutter system to the fourth angular position of the set of segments where the incoming beam is reflected from mirror 50 onto the fourth segment of the set. This fourth segment 35 on shutter ring 26 is reflective and deflects the light beam downwardly along the path 74 where it passes through the fourth segment 47 on shutter ring 30, which is an aperture. This permits the light to follow path 82 to strike web 24 at target area D and to produce perforation 84.

Rotation of discs 12 and 14 through an angle corresponding to the angular extent of a single set of segments produces a scanning motion of the light beam 20, producing bursts, or impulses, of light at discrete target areas A, B, C, and D to produce well defined perforations 68, 72, 80 and 84, respectively. These perforations are formed in sequence, and constitute a scanning of the beam laterally across web 24. Continued rotation of discs 12 and 14 will cause a repeat of this scan, producing a second transverse row of perforations across the web, the second row being spaced from the first row by a distance dependent upon the linear speed of web 24 in the longitudinal direction. The speed relationship between the motion of the web and the shutter/scanner system 10, and the angle of the web with respect to the plane defined by the light paths 66, 70, 78 and 82, will determine the exact angle of the transverse row of perforations with respect to the edge of the web. In order to provide uniform and controllable results, it is preferred that the drive mechanism for the web 24 be synchronized either electrically or mechanically, by means not shown, with the drive mechanism 18 of spindle 16. Such synchronization may be obtained by any conventional motor drive and need not be described here.

The particular arrangement of aperture and reflective segments in each set of segments is merely illustrative of the principles of the invention and, as described above, provides a sequential scan from target areas A through D. However, by rearranging the sequence of reflective and non-reflective segments; i.e., by changing the coding of each group of segments, the scan pattern may be varied to direct the light beam to the target areas in any desired sequence. The scan pattern can be repetitive for each group of segments around the circumference of each disc or, if desired, each group of segments may be different with the pattern being repetitive for each full rotation of the discs.

With the groups-of-four coding illustrated in FIG. 1, the continuous beam 20 is divided into four equal output beams, each of which has an "on" time equal to one-fourth the time required for a single complete scan. Thus, the light follows paths 60 and 62 to the outer shutter ring 28 for one-half the time and follows path 74 to shutter ring 3 the remaining one-half the time with each of rings 28 and 30 further subdividing their incident beams to produce the four output beams. The total time required for a single scan depends on the angle subtended by the four segments making up a group of segments and on the angular speed of rotation of the discs. Each output beam, or impulse, has a ratio of 1 to 4 of "on" to "off" time when all of the segments are of the same size. However, the device is not limited to such a ratio and by the selection of appropriate geometry, as by providing segments with different angular widths or by providing additional shutter rings, virtually any number of output impulses in any desired ratio of on to off time may be obtained for each scan.

Although the perforations produced by the light beam impulses are illustrated as being generally round in shape, their exact shape will be a function of the size of the segments carried by the discs, the speed of rotation of the discs, and the relative direction and speed of motion of the web. With beam 20 being continuous and the output light impulses each occupying one-fourth of a scan cycle, a relatively low web speed with respect to the speed of rotation of the shutter system 10 may result in an elongated or slot-shaped perforation.

The scanning speed of the device, which corresponds to the time required for the production of a single set of output impulses (one impulse to each of the target areas A through D), is dependent not only on the rotational speed of shaft 16, by on the angular extent of the segments carried by the shutter rings 26, 28 and 30. If each segment covers a relatively large angular distance, thereby reducing the number of groups of segments that can be accommodated around the circumference of a ring, the scanning rate will be reduced for a given rate of rotation. Similarly, slowing down or speeding up of the rotation of the shaft will vary the scanning rate. In order to reduce the mechanical problems inherent in high rotational speeds, it may be desirable to increase the number of sets of segments in the shutter rings so that the desired scanning rates can be obtained at relatively low disc speeds.

The size of the perforations also depends upon the diameter of beam 20, its shape, and the amount of scattering that occurs at the various reflection points in the beam paths. In order to avoid scattering effects at the boundaries of the apertures, it is preferred that the wall surfaces defining each aperture be angled in the manner illustrated in FIG. 4A. In this figure, a segment 39" is shown as including a through aperture having opposed side walls 86 and 87 which are angled away from the top surface of the segment to provide sharply angled upper edges at the surface which receives light beam 20. This angled edge provides a sharp cutoff line for the impinging light as the disc 14 rotates, thereby reducing scattering and ensuring sharply defined perforations in web 24.

If additional ouput light paths are required, they may be obtained either by adding shutter rings to the discs 12 and 14, or by providing additional rotating discs with appropriate annular shutter rings provided at appropriate radial distances from the axis of shaft 16. To accommodate the additional beam paths the coding arrangement of the annular shutter rings must be changed so that the number of segments in each group will correspond to the number of output beams produced for each scanning cycle. Thus, if six output beams are required, then each group will consist of six segments angularly arranged as described above to provide six different paths for the light beam.

Although the shutter arrangement of FIGS. 1–4 has been illustrated with a light source 22 directing the light beam against the under surface of disc 12, it will be apparent that the light source may equally well be located to direct the beam against the upper surface of this disc in the direction of the arrow 20' in FIG. 2, for example. In this case, the reflective surface on segments 34 and 35 would have to be on the top surface of the disc, and the code arrangement for the reflective and through segments on the other rings would have to be altered correspondingly, but otherwise the function of the device would be as describd above.

Figure 5:
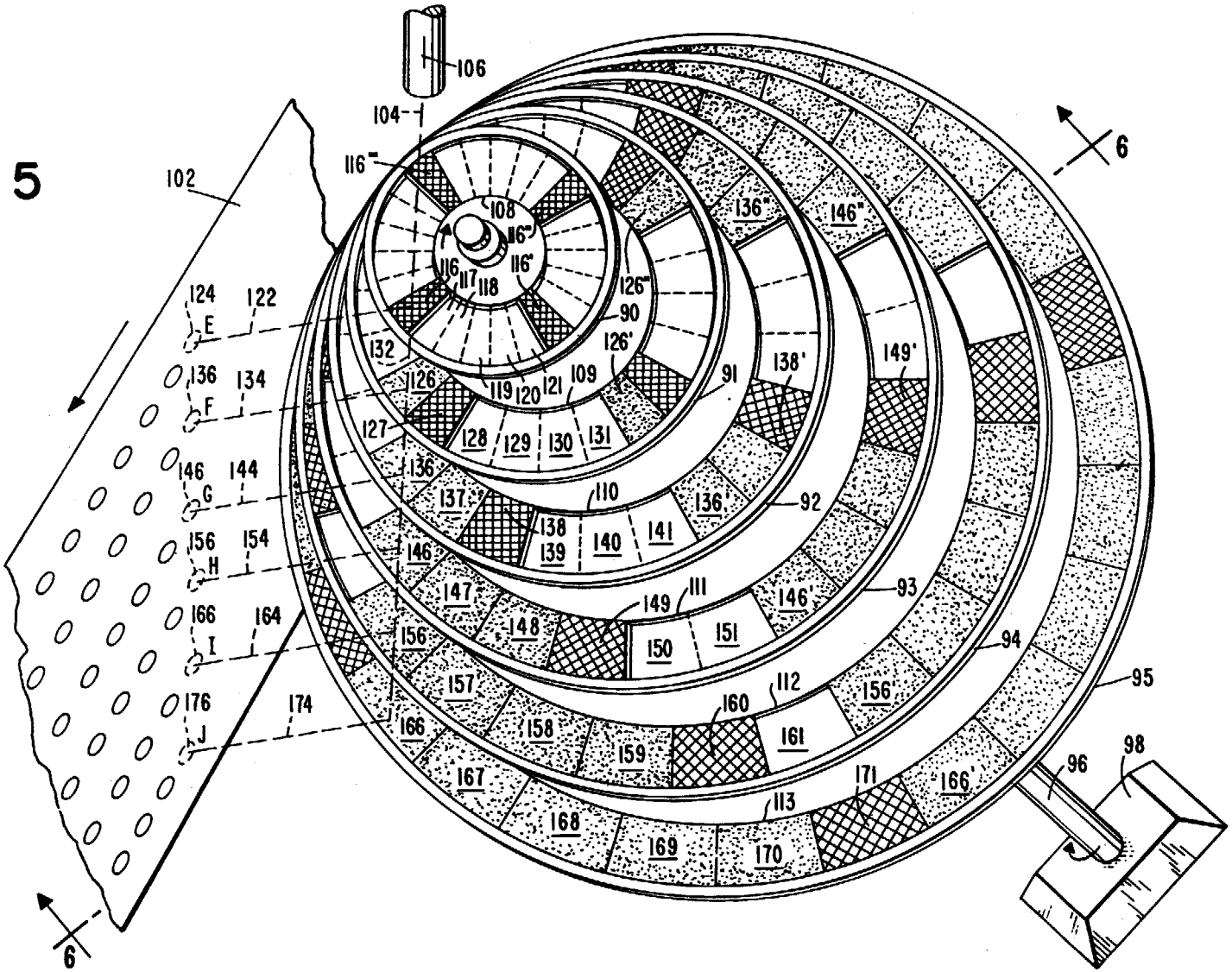
FIG. 5 is a perspective view of a second embodiment of the shutter/scanner system constructed in accordance with the present invention.
Figure 6:
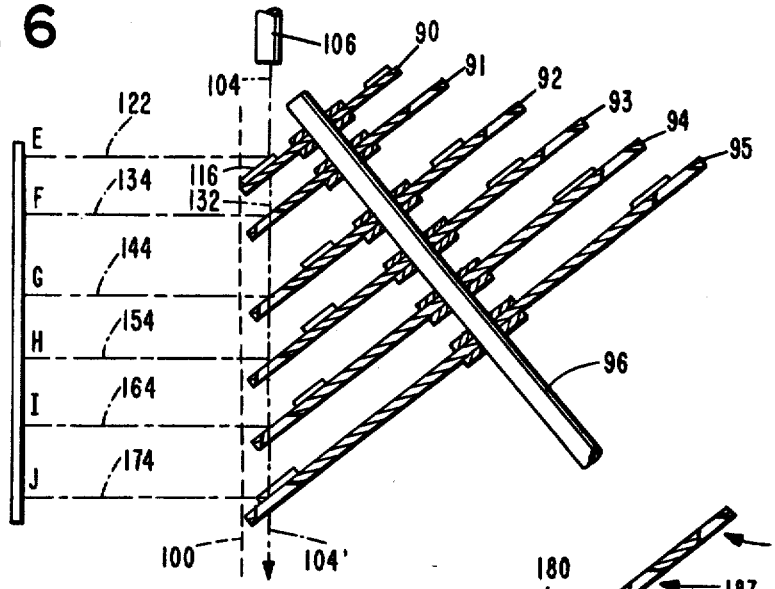
FIG. 6 is a cross-sectional, reduced view taken along line 6—6 of FIG. 5.

A second embodiment of the same invention utilizing the techniques discussed above, but with a different arrangement of the segment rings, is illustrated in FIGS. 5 and 6, to which reference is now made. In this embodiment, the rings are carried on a plurality of spaced, parallel discs 90–95 mounted on a shaft 96 which is supported for rotation by suitable bearing means and which is driven by suitable motor or gearing means 98. The discs 90–95 are of increasing diameter so that when the drive shaft 96 is at the angle desired for operation of the device, the outermost edges of the discs will be tangent with a plane 100 (see FIG. 6). This plane is preferably, but not necessarily, parallel to the plane of a web 102 onto which the beam of light 104 from a source such as a laser 106 is to be directed. In a preferred form of the invention, the shaft 96 is at a 45° angle with the plane 100, the discs 90–95 are perpendicular to the axis of shaft 96 so that the surfaces of the discs are at a 45° angle with plane 100, the incoming light beam is parallel to the plane 100, and each of the discs carries at its peripheral edge an annular shutter ring of the type described above with respect to FIG. 1.

The shutter rings, which are indicated at 108 through 113 in FIG. 5, are divided into a plurality of open apertures, reflective surfaces, or unused segments which may be either open or closed, these segments being spaced around the periphery of the discs in coded sequence so as to pass or reflect the light beam 104 along a selected one of several available paths. Since, in this embodiment, six output beams are provided, a single scan cycle will require a set, or group, of six segments arranged as illustrated at 116–121 on disc 90. With the arrangement of this figure only one of this group of segments need be reflective, the remaining segments being in the form of through openings which permit the incoming light beam to pass through the disc for reflection from a reflective segment on another disc. For example, segment 116 may be reflective, in which case the incoming beam 104 would be reflected from that segment to follow light path 122, striking target area E on web 102 to form a perforation 124. The remaining segments 117–121 of disc 90 are apertures and upon clockwise rotation of shaft 96, each of these segments permits the passage of beam 104 through the disc. Continued rotation of the shaft through the angle defined by segments 116–121 completes a scan of the light beam output positions and returns the beam to its initial position when the second reflective segment 116' becomes aligned with the incident beam 104. As indicated in FIG. 5, four reflective segments 116, 116' 116", and 116"' may be provided around the circumference of disc 90, providing four light bursts along path 122 for each revolution of shaft 96.

The shutter ring 109 on disc 91 includes a plurality of segments 126–131 which correspond with, and are angularly aligned with, segments 116–121 on disc 90. Because segment 126 is aligned with reflective segment 116, it will not receive light from source 106; however, when shaft 96 rotates sufficiently far to permit light to pass through aperture 117, the light beam 104 will follow light path 132 and will strike segment 127. If segment 127 is reflective, the light beam will follow path 134 to target area F and will produce a perforation 136 in web 102. The remaining segments 128–131 form through openings to permit the light beam to pass through to the next disc 92 for the remainder of the scan cycle. Thus, when the light beam falls on segment 118 of disc 90, it will pass therethrough and will fall on segment 128 of disc 91. This being an open segment, the light will pass through it and fall on segment 138 of disc 92, which segment is reflective and will cause the light beam to follow path 144 to target area G, where perforation 146 will be formed. Since segments 136 and 137 receive no light while the beam is blocked by the segments 116 and 127 laying above them, they may be open, closed, or reflective, as desired, since they have no effect on the operation of the device. However, segments 139, 140, and 141 must be open apertures, in the illustrated configuration, to permit proper operation of the device.

Further rotation of shaft 96 brings beam 104 into alignment with segments 119, 129 and 139 on discs 90, 91 and 92, allowing the light to pass down to disc 93, which carries segments 146–151 in angular alignment with the corresponding segments in the discs which lie above it. Thus, the light beam strikes segment 149, which is reflective on its upper surface and which thereby directs the light beam along light path 154 to target area H on web 102, where perforation 156 is formed. Segments 150 and 151 are through apertures on disc 93.

Disc 94 corresponds to the preceding discs and carries segments 156–161. Here again only one of the segments is reflective, in this case segment 160, and only the following segment 1616 need be a through aperture to permit light to fall on the last disc 95. Segment 160 diverts the light beam along path 164 to target area I, whereby perforation 166 may be formed. Finally, disc 95 carries a set of shutter segments 166–171, of which only segment 171 need be reflective to divert the light beam along light path 174 to target area J, whereby perforation 176 may be formed. It will be noted that disc 95 need not carry any through apertures, since the segments preceding segment 171 receive no light, and 171 serves only to reflect it onto the web.

Again, as illustrated in FIG. 5, the sets or groups of segments are repetitive around the circumference of each disc, with corresponding segments being aligned so that the rotation of shaft 96 causes the output beams following paths 122, 134, 144, 154, 164 and 174 to scan across the width of web 102. Although the arrangement of aperture and reflective segments is illustrated to provide a scan from target area E through target area J, it will be apparent that variations will be possible by varying the direction or rotation of a shaft, by coding the reflective segments differently to provide a different scan pattern, or by making other minor changes in the apparatus. For example, the arrangement of FIG. 6 produces six output beams; however, by adding one segment to each set of segments on each of the discs 90–95, an additional output beam can be derived. All of these additional segments would be through openings, so that the beam would pass through all of the discs to produce an output beam 104'. Further, by adding discs to shaft 96 and by rearranging the sets of segments so that each set includes the same number of segments as there are output beams, with the segments being angularly aligned and complementary in their code arrangement, the input energy may be divided into any desired number of output impulses, with each output impulse receiving the full power of the input beam for a proportional period of time. Thus, if there are "n" output light paths, each disc must carry "n" segments in a set and each target area will receive energy for a portion of a scan cycle equal to l/n. The exact duration of each light pulse will depend upon the size of the apertures and the speed of rotation of shaft 96.

Figure 7:
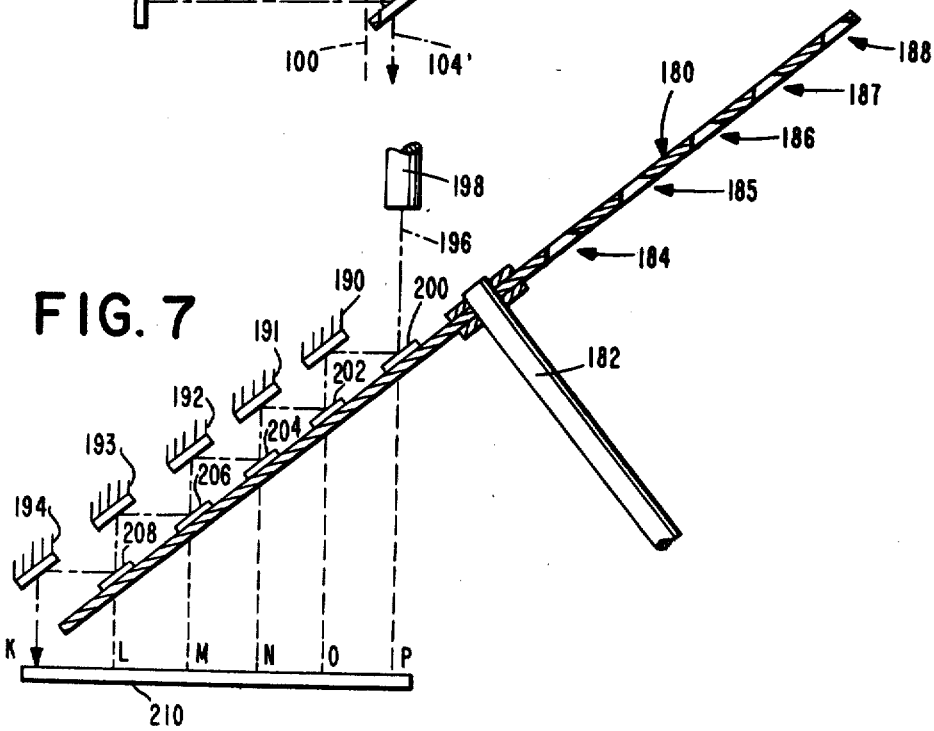
FIG. 7 is a cross-sectional view of a third embodiment of the invention.

Another variation of the inventive concept disclosed herein is illustrated in diagrammatic form in FIG. 7, wherein a single disc 180 is mounted on a drive shaft 182. The disc carries a plurality of rings 184–188, each of which is divided into sets of corresponding reflective and through aperture segments angularly aligned and arranged to define a selected number of light paths. In the illustrated arrangement, a series of stationary mirrors 190–194 cooperate with the disc segments to provide reflective beam diverters for the light paths, with different mirrors forming parts of different light paths. In this embodiment, the incoming light beam 196 furnished by light source 198 is directed toward a reflective segment 200 on ring 184 and is deflected to mirror 190. The mirror in turn deflects the beam back toward reflective segment 202 of rings 185 on the disc. In the particular angular position of disc 180 which is illustrated, the beam of light continues on the path defined by mirror 191, reflective segment 204 of ring 186, mirror 192, reflective segment 206 of ring 187, mirror 193, reflective segment 208 of ring 188, and, finally, mirror 194, which directs the light impulse to target area K of a web or other target 210.

The output beam impulses may be shifted to the various target areas L–P on web 210 by rotation of disc 180 to align other segment combinations with the stationary mirrors 190–194, thereby changing the reflective path. The output beam will fall on whichever target area is aligned with a through aperture in the segment ring closest to the axis of the disc. The sequence in which the target areas are illuminated by the light beam is dependent on the particular coding of the segments, while the number of output beams depends on the number of segments in each ring, in the manner explained above.

In each of the shutter embodiments discussed above, the incoming continuous beam is, in effect, time divided into a plurality of output beams. This is accomplished by diverting the incoming beam along a multiplicity of distinct paths to direct the beam to selected target areas. The time division of the beam produces at each target area a light impulse of full intensity, but for a limited time; where the incoming light beam is to be divided into "n" impulses, each output impulse will have a constant intensity for a period of time equal to l/n times the period of a single scan; i.e., where the shutter produces a single scan of all of the target areas in time t, each target area will receive the full intensity of the light source for a period t/n during a scan.

Essentially all of the incoming light is projected onto the target areas by the shutter arrangement of the invention, although there will be some transition loss and some scattering at each switching point between a reflective segment and a through segment. Further, since the beam diameter is finite, the movement of a reflector into the beam path will not be instantaneous and thus there will be a gradual change in the direction of the light impulse, producing sloped leading and trailing edges for the beam impulses. This effect may be minimized by shaping the sidewalls of the aperture segments so that they have sharply defined edges and angular walls, as shown in FIG. 4A, so as to provide as short a transition time as possible. This will cause the beam intensity to have a sharp changeover and will assist in producing a well-defined perforation. It should also be observed that corresponding segments on the various shutter rings should be angularly aligned with great precision to ensure sharp transitions in the light paths and maximum transfer of energy to the target areas.

If it is desired to change the "n" ratios of the beam impulses produced by the shutter mechanism of the present invention, a radially oriented mask, or light absorber, may be provided for each disc. This absorber may be moved over portions of the reflective surfaces or the apertures to shorten the impulses produced by the various paths. However, such an absorber should be used only when it is desired to change the "n" ratios by a small increment; this arrangement is undesirable for large changes in "n" values, since energy is being wasted when it is absorbed. If a large variation in "n" value is desired, a change should be made in the disc arrangement, in the size of the segments in the shutter rings, in the speed of rotation of the shutter system, in the speed of motion of the web, or the like. However, the use of a mask arrangement does have the advantage of permitting small temporary changes in impulse duration.

Although variations are possible, in general the number of output impulses available from any of the foregoing shutter arrangements is one greater than the number of segment rings. Thus, if y segment rings are provided, y+1 output impulses will be available. In FIG. 2, for example, three rings are used to produce four impulses, in FIG. 6, six rings are capable of producing seven impulses, and in FIG. 7, five rings result in six output impulses.

Figure 8:
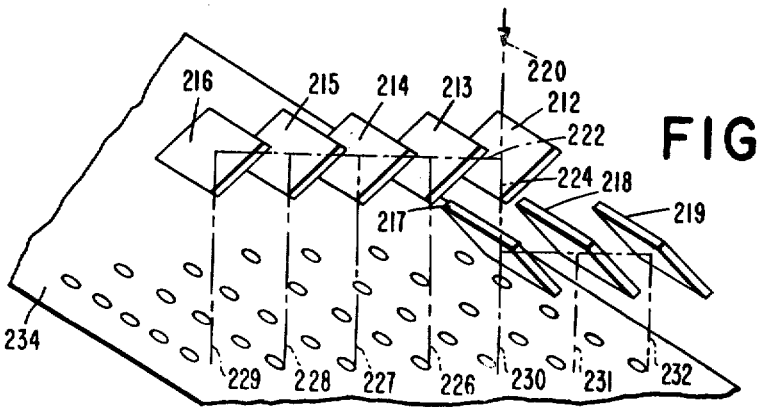
FIG. 8 is a perspective view of a conventional beam splitter.

Although the present invention is directed to a system for dividing a beam of light into a plurality of segments without loss of energy, it should be recognized that if desired those impulses may themselves be directed through a conventional beam splitter to further disperse the enrgy of the beam. Such an arrangement is illustrated in FIG. 8 where a plurality of partially reflective mirrors 212–219 are positioned to divide a light impulse in the form of light beam 220 into seven parts. As is well known, the partially reflective mirrors may be designed to reflect a selected proportion of the incident energy and to pass the remaining energy therethrough. Thus, the incoming beam 220 is partially reflected along path 222 with the remainder of the beam energy continuing through mirror 212 along path 224. The light following path 222 is similarly partially deflected by mirrors 213, 214 and 215 in sequence, with any light which passes through mirror 215 being deflected by mirror 216, thereby producing light impulses on paths 226 through 229, respectively. In similar manner, the light from path 224 is partially deflected and partially passed by mirrors 217 and 218, with the light which passes through mirror 218 being deflected by mirror 219, thereby producing light paths 230–232, respectively. Thus, light beam 220 is split into corresponding paths 226–232 and the resulting simultaneous outputs may then be directed through suitable optical lenses (not shown) to do work such as perforating paper or other materials in web or sheet form. In this arrangement, the location of the holes or slots in a web 234 may be controlled by the optical system, as well as by regulating the shutter rate and web speed. Again, by synchronizing the shutter speed with the web speed, constant hole spacing may be maintained.

In a preferred use of the instant invention, the web material which is perforated by the intermittent laser beam impulses consists of paper for use in "tipping" a cigarette; that is, the perforated paper is used to unite a filter plug to a tobacco rod in the manufacture of the cigarette. The web is sufficiently wide to accommodate several tipping strips which are formed longitudinally along the web, and these tipping strips are cut from the web by a longitudinal cut extending the length of the web. The tipping strip includes one longitudinal row of holes, and accordingly, it is important that the holes be cleanly formed and evenly spaced.

Thus, there has been disclosed a new and unique rotary shutter for dividing a continuous laser beam into a plurality of full-intensity, short impulses which may be used to produce a series of perforations at selected target areas in a definable and selectable sequence. Although the invention is illustrated in terms of a preferred form, the invention is not limited thereto, but includes those variations and modifications that will be evident to persons of skill in the art; accordingly, the present application is limited only by the following claims, which define the true spirit and scope of the invention.

What is claimed is:

1. A rotary optical shutter and scanner for dividing a substantially continuous beam of light into a plurality of discrete light impulses and for repetitively scanning the impulses across a series of target areas, comprising:

a plurality of [coaxial] rotatable discs;

at least one annular shutter ring on each said disc *and at least two concentric annular shutter rings on at least one of said discs*, each shutter ring including at least one group of segments, said rings having corresponding, angularly aligned groups, the segments of each group being arranged in complementary coded sequences of reflective surfaces and through apertures to define multiple light paths between a light source and a target;

means for directing a substantially continuous beam of light toward at least one of said shutter rings for reflection from a reflective surface or passage through an aperture thereof and for subsequent direction toward a first target area or toward a second shutter ring for reflection from a reflective surface thereon or passage through an aperture thereof for direction toward a second target area; and means for rotating said discs to move said segments of said annular rings into successive alignment with said beam of light whereby said beam is directed successively along said multiple light paths to each of said target areas, continued rotation causing said beam to repetitively traverse said target areas in a scanning motion.

2. The optical shutter and scanner of claim 1, further including reflective mirror means mounted adjacent said discs for directing said beam along said light paths.

[3. The optical shutter of claim 1 wherein at least one of said discs carries two concentric, annular shutter rings.]

[4. The optical shutter of claim 1, wherein each of said discs carries a single optical shutter ring, each said corresponding to, and directing said light beam toward, a predetermined target area.]

5. The optical shutter of claim 1, wherein said coded shutter ring segments are so aligned that said continuous beam is deflected along said multiple paths sequentially to divide said beam into a plurality of discrete light impulses each having substantially the same intensity as said original continuous beam.

6. The optical shutter of claim 5, wherein each group of segments includes n segments, the corresponding segments on each of said annular shutter rings being so coded as to direct said light beam along each of n optical paths to n corresponding target areas upon rotation of said discs.

[7. The optical shutter of claim 6, wherein said plurality of rotatable discs comprises n discs, each of said discs carrying a single optical shutter ring.]

[8. The optical shutter of claim 6, wherein said plurality or rotatable discs comprises two discs, at least one of said discs carrying two concentric, annular shutter rings, said shutter further including reflective mirror means mounted adjacent said discs for cooperation with said segments in directing said beam along said light paths.]

9. The optical shutter of claim 6, wherein n-l annular shutter rings are provided.

10. The optical shutter of claim 1, wherein each shutter ring includes at least two groups of segments to produce at least two scans of said [target area] *series of target areas* by said beam for each revolution of said rotatable discs.

11. The optical shutter of claim 1, further including web means adjacent said discs, said target areas being spaced locations on said *series of* web means.

12. The optical shutter of claim 11, further including means for moving said web with respect to and in synchronization with said discs whereby successive traverses of said *series of* target areas by said beam of light will scan different areas of said web.

13. The optical shutter of claim 12, wherein said source of light is a laser having sufficient intensity to perforate said web at each of said *series of* target areas to produce a [row] *series* of perforations across said web for each scan of said beam.

14. The optical shutter of claim 13, wherein said web is paper.

15. An optical scanner for dividing a continuous beam of light into a sequence of n light impulses and directing each of said impulses to a corresponding discrete target area, said scanner directing said impulses to all of said target areas during a time period t, each light impulse having substantially the same intensity as said beam of light but having a duration of approximately t/n comprising:

first and second spaced, parallel discs coaxially mounted for rotation on a common shaft;

a first annular shutter ring carried by and coaxial with said first disc;

second and third concentric annular shutter rings carried by and coaxial with said second disc;

first, second and third groups of n segments formed on said first, second and third shutter rings, respectively, said segments being angularly spaced along said shutter rings with corresponding segments on said shutter rings being angularly aligned with each other, the corresponding segments subtending the same angle at the axis of said shaft and being arranged in complementary coded sequences of reflective surfaces and through apertures at n spaced angular locations about said shaft to define n light paths between a light source and n discrete target areas, the segments at each spaced angular location about said shaft defining a distinct light path to a target area;

means for directing an incoming beam of light toward said second shutter ring for reflection from a reflective segment to said first shutter ring or passage through an aperture segment to said third shutter ring and for subsequent reflection from or passage through corresponding segments of said first or third shutter rings to follow one or another of said light paths depending upon the angular position of said discs with respect to said incoming beam of light; and means for rotating said discs whereby said light beam follows each of said light paths in sequence and is thereby divided into n impulses which are directed to corresponding target areas in sequence to provide a single scan of said target areas upon rotation of said discs through the angle subtending said group of segments.

16. The optical scanner of claim 15, wherein said discs rotate through an angle corresponding to a group of segments in a time t, and wherein the beam impinges on each target area for a time equal to t/n.

17. The optical scanner of claim 16, further including mirror means adjacent said discs for further defining said paths.

18. The optical scanner of claim 17, wherein n=4.

19. The optical scanner of claim 17, wherein each shutter ring carries at least two groups of segments, whereby said target areas are scanned twice for each revolution of said discs.

20. The optical scanner of claim 17 wherein at least some of said segments are not a part of any of said light paths, at least one segment in each group being reflective and at least one segment in each group being a through aperture, the remainder of said segments being closed.

*21. The optical shutter of claim 1 wherein said plurality of rotatable discs are parallel to one another and carried on a single shaft.*

*22. A rotary beam interrupter and scanner system for dividing a continuous beam of light from a laser into a plurality of discrete beam impulses having different paths with substantially no loss of beam energy, each beam impulse having substantially the same intensity and energy as said original continuous beam comprising:*

*a movable web of tipping paper having a plurality of target areas arranged transversely across the web;*

*at least two rotatable planar disc elements, said disc elements being adapted to rotate in corresponding spaced-apart parallel planes;*

*at least one annular shutter ring on each of said disc elements, each shutter ring including at least one group of segments, said rings having corresponding, angularly aligned groups, the segments of each group being arranged in complementary coded sequences of reflective surfaces and through apertures to define multiple light paths, each path leading from a single light source to one of said target areas on said tipping paper;*

*means for directing a substantially continuous beam of light from a laser toward at least one of said shutter rings for reflection from a reflective surface thereon or passage through an aperture thereof, and for subsequent direction toward a first of said target areas or toward a second shutter ring for reflection from a*

*reflective surface thereon or passage through an aperture thereof for direction toward a second of said target areas on said web; and*

*means for rotating said disc elements in their corresponding parallel planes to move said segments of said annular rings into successive alignment with said beam of light, said beam being directed successively along said multiple light paths to each corresponding target area, to produce a row of spaced perforations in said web, continued rotation causing said beam to repetitively scan the target areas so that longitudinal motion of said web produces a series of perforations along the length of said web, the spacing between adjacent perforations being dependent upon the linear speed of the web in the longitudinal direction with respect to the speed of rotation of said disc elements.*

*23. The device of claim 22, further including means for moving said web longitudinally with respect to said target areas, whereby said perforations are longitudinally spaced along said web.*

*24. The device of claim 22, wherein said shutter rings carried by said rotatable disc elements are of different diameters.*

*25. The device of claim 22, wherein said rotatable disc elements are coaxial.*

*26. The device of claim 25, wherein said rotatable disc elements are mounted on a common shaft.*

*27. An optical scanner for dividing a continuous beam of light into a sequence of n light impulses and directing each of said impulses to a corresponding one of n discrete target areas, said scanner repetitively directing a single impulse to each of said target areas in sequence within a time period t, each light impulse having substantially the same intensity as said beam of light, but having a duration of approximately t/n, comprising:*

*(a) at least one disc adapted for rotation about an axis;*

*(b) a plurality of concentric, annular shutter rings carried by said rotatable disc, the number of shutter rings being at least equal to n-1;*

*(c) at least one group of segments formed on each of said shutter rings, said rings having corresponding groups angularly aligned with each other with respect to said disc axis, and each said group having corresponding segments angularly aligned with each other so that corresponding segments subtend the same angle at said axis, said segments in each group and in each shutter ring being arranged in complementary coded sequences of reflective surfaces and through apertures at n spaced angular locations about said axis to define n light paths between a light source and n discrete target areas, the segments at each spaced angular location about said axis defining a distinct light path to a target area;*

*(d) means for directing an incoming beam of light toward at least one of said plurality of shutter rings for reflection from a reflective segment or passage through an aperture segment thereof for direction to target area or to another of said shutter rings; and*

*(e) means for rotating said disc whereby said light beam follows each of said light paths in sequence and is thereby divided into n impluses which are directed to corresponding target areas in sequence to provide a single scan of all of said target areas upon rotation of said discs through the angle subtending said group of segments.*

*28. The scanner of claim 27 wherein all of said shutter rings are carried by a single disc, and further including a plurality of stationary reflective beam diverters adjacent said disc and cooperating with selected ones of said aperture rings to form portions of said light paths.*

*29. Apparatus for perforating multiple holes in a web of tipping paper, comprising:*

*(a) a movable web of tipping paper;*

*(b) a plurality of target areas arranged tranversely across the web;*

*(c) a plurality of rotatable disc elements adapted to rotate in corresponding spaced-apart parallel planes;*

*(d) at least one annular shutter ring on each said disc element, each shutter ring including at least one group of segments, said rings having corresponding angularly aligned groups, the segments of each group being arranged in complementary coded sequences of reflective surfaces and through apertures to define multiple light paths between a light source and said target areas;*

*(e) means for directing a substantially continuous beam of light from a laser toward at least one of said shutter rings for reflection from a reflective surface or passage through an aperture thereof and for subsequent direction toward a first one of said target areas or toward a second shutter ring for reflection from a reflective surface thereon or passage through an aperture thereof for direction toward a second one of said target areas;*

*(f) means for rotating said discs to move said segments of said annular rings into successive alignment with said beam of light to direct said beam successively along said multiple paths to each of said target areas so that said beam of light traverses said target areas to perforate the web at each target area; and*

*(g) means for moving said web with respect to and in synchronization with the rotation of said rings to regulate the spacing of said perforations along the length of the web.*

* * * * *